United States Patent [19]
Ito et al.

[11] 3,774,736
[45] Nov. 27, 1973

[54] HYDRAULIC CONTROLS FOR TRANSMISSION WITH BRAKE PRIORITY VALVE

[75] Inventors: Shin Ito, Toyota-shi; Hiroshi Kawaguchi, Aichi, both of Japan

[73] Assignee: Toyota Vidosha Kogyo Kabushiki Kaisha, Toyota-shi, Aichi-ken, Japan

[22] Filed: Sept. 22, 1971

[21] Appl. No.: 182,736

[30] Foreign Application Priority Data
Sept. 24, 1970  Japan.............................. 45/82979

[52] U.S. Cl.................. 192/4 A, 188/359, 60/52 B
[51] Int. Cl............................................. B60k 29/00
[58] Field of Search..................... 192/4 A, 4 B, 4 C; 188/359

[56] References Cited
UNITED STATES PATENTS

| | | | |
|---|---|---|---|
| 2,758,684 | 8/1956 | Stickel | 192/3 R |
| 3,099,500 | 7/1963 | Anderson | 188/359 X |
| 2,247,714 | 7/1941 | Peterson et al. | 192/4 A |
| 3,386,523 | 6/1968 | Ruhl | 192/4 C |
| 3,136,399 | 6/1964 | Granryd | 192/4 A |
| 2,299,475 | 10/1942 | Farmer | 192/4 A |
| 2,968,967 | 1/1961 | Ross | 192/4 A X |
| 3,640,359 | 2/1972 | Clark et al. | 192/4 B X |

Primary Examiner—Benjamin W. Wyche
Attorney—Toren and McGeady

[57] ABSTRACT

In a vehicle having a transmission system and a brake system for providing a double braking force, a hydraulic brake control circuit is arranged for interconnecting both the transmission system and the brake system. In the hydraulic brake control circuit, a pump supplies oil under pressure from a supply source to a speed change valve of the transmission system and to a master cylinder of the brake system. A passage is provided from the oil pump and it branches off into separate passages leading to the speed change valve and to the master cylinder. In the passage leading to the speed change valve, a further branch passage is provided with a valve arrangement which is connected to the passage leading to the brake system. An accumulator is arranged in the passage to the brake system for affording a source of pressure for the doubled braking force in the brake system. A priority valve arrangement is connected to the passage leading to the brake system to assure a source of pressure for the proper operation of the brake system. To assure the proper source of pressure for the brake system, the oil passage is connected directly to the brake system and the brake system is connected, in turn, to the speed change valve.

1 Claim, 8 Drawing Figures

INVENTORS
SHIN ITO
HIROSHI KAWAGUCHI

BY Toren and McGeady
ATTORNEYS

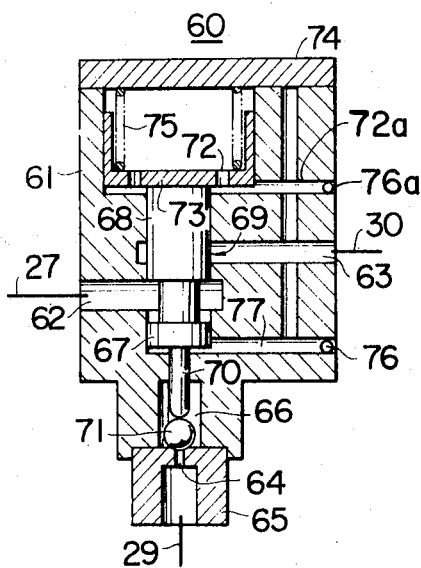
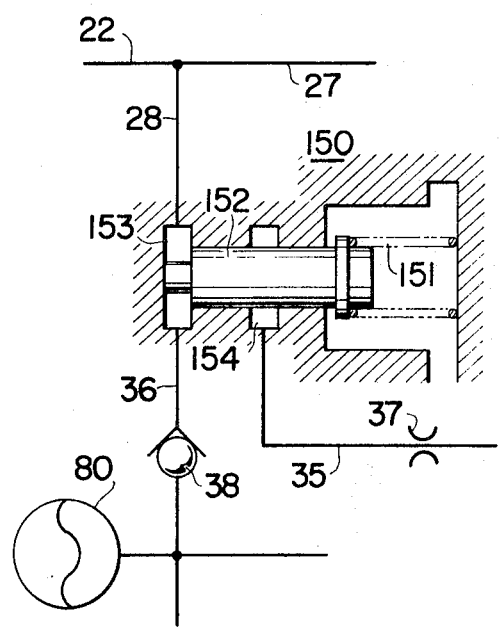
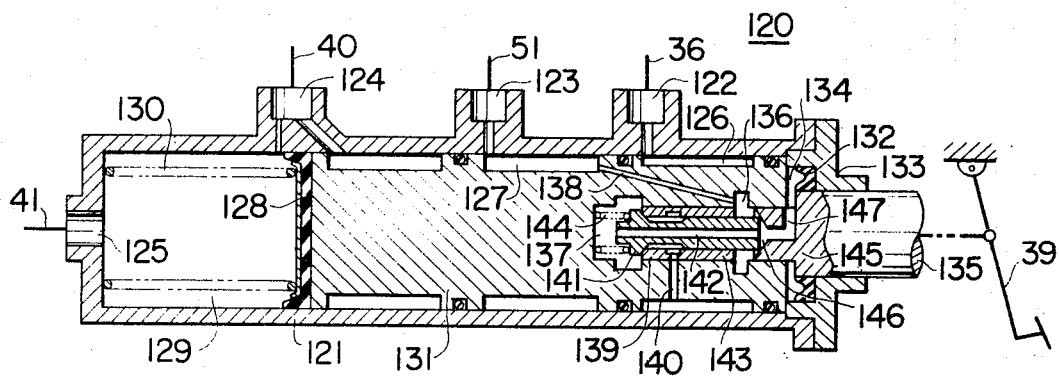

INVENTORS
SHIN ITO
HIROSHI KAWAGUCHI

BY Toren and McGeady

ATTORNEYS

HYDRAULIC CONTROLS FOR TRANSMISSION WITH BRAKE PRIORITY VALVE

BACKGROUND OF THE INVENTION

This invention relates to a hydraulic brake control circuit for vehicles, such as automobiles having an automatic transmission with a variable change gear ratio, and, more particularly, it is directed to a hydraulic brake control circuit in which a master cylinder and a brake booster serving as a braking force doubling means are provided in the brake system and an oil pump is used for supplying hydraulic pressure to the brake system and to the means for effecting a speed-change in the transmission.

In a conventional brake system for vehicles, the master cylinder, which is connected directly to the brake pedal, is hydraulically connected to the wheel cylinders of the vehicle wheels through a brake booster provided with a diaphragm so that the braking pressure produced in the master cylinder due to the depression of the brake pedal, is further increased by the brake booster to produce a strong braking force. However, this brake booster usually utilizes the negative suction pressure of the engine as the power source, and this negative pressure of the engine acts on one side of the diaphragm of the brake booster to obtain a high braking oil pressure than on the other side. Therefore, since the maximum negative pressure produced in the engine is one atmospheric pressure, the diaphragm must necessarily be enlarged to provide a multiplied braking force by directly applying such power of negative pressure to the booster operation. This inevitably requires the enlargement of the brake booster mechanism as a whole and makes it difficult to find a place for mounting the enlarged booster mechanism within the hydraulic brake line which is usually located in the under portion of a vehicle. Further, since the amount of air taken into the engine varies according to the movement of the booster diaphragm at the time of the application or release of the brake, there is a possibility that the discharge gas from the engine is worsened.

SUMMARY OF THE INVENTION

The primary object of the present invention is to eliminate the above-mentioned defects and to improve the performance of the brake system both structurally and operationally.

To accomplish this object, the present invention proposes a novel hydraulic brake control circuit in which, because the outlet or discharge oil pressure from the oil pump used for the transmission is sufficiently large, it is possible to utilize the oil pump as a common source for supplying oil pressure to the means for doubling the braking force of the brake system and to the means for effecting speed-change in the transmission. Also, according to the present invention, the oil pump is hydraulically connected to the means for effecting speed-change through an oil passage having an orifice and through an unloader valve which is controlled by an accumulator. The oil pump is also hydraulically connected to a booster-attached master cylinder of a closed center type used as the means for doubling the braking force through a check valve and the accumulator. The oil pressure supplied to the speed-change effecting means is stored in the accumulator so that when the brake is applied, the high oil pressure accumulated acts to double the braking force acting through the booster-attached master cylinder. Valve means are also provided in the oil passage hydraulically connected between the oil pump and the speed-change effecting means, whereby should reduction of the braking force doubling oil pressure take place, the supply of oil pressure to the speed-change effecting means is interrupted, and a constant oil pressure is ensured for doubling the braking force.

It is also envisaged to provide the hydraulic brake control circuit so that the oil pump is hydraulically connected directed to the booster-attached master cylinder and to the speed-change effecting means from the booster-attached master cylinder through a release valve, and pressure from the oil pump is supplied to the speed-change effecting means through the booster-attached master cylinder so as to produce a braking force doubling action in said master cylinder and a speed-changing action in the speed-change effecting means when the brake is applied.

The present invention also proposes a hydraulic brake control circuit in which the oil pump is hydraulically connected directly to the booster-attached master cylinder of an open center type used for the braking force doubling means, and the master cylinder being, in turn, hydraulically connected to the speed-change effecting means through a relief-attached flow control valve having a throttle section, so that upon encountering a circuit loss, variation of braking force or any other abnormality resulting from the direct use of discharge oil pressure of the oil pump, only a certain prescribed amount of discharge oil pressure from the oil pump is guided to the means for doubling the braking force with the remaining extra portion of oil pressure is supplied to the means for effecting the speed-change.

It is also contemplated to provide a hydraulic brake control circuit of the type described in which oil pressure supplied to the speed-change effecting means is adjusted by an oil pressure adjusting means.

Thus, according to the present invention, it is possible to obtain high power on the order of 20 kg/cm$^2$ without any need of a separate power source for the doubling of the braking force, and also the size of the braking force doubling mechanism is noticeably reduced as compared with the conventional devices using intake negative pressure of the engine and also is completely disassociated from the amount of intake air for eliminating any possibility of producing deleterious effects on the discharge gas from the engine. Further, the master cylinder of the braking means and the booster of the braking force doubling means can be combined into a single mechanism to provide structural and operational advantages over conventional brake systems.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIGS. 2 to 4 show a first embodiment of a hydraulic brake control circuit according to the present invention, where FIG. 2 is a diagrammatic illustration of the hydraulic circuit showing the entire control circuit, FIG. 3 is a sectional view showing the details of an unloader valve as indicated in FIG. 2, and FIG. 4 is a sectional view showing the details of a closed center type booster-attached master cylinder as shown in FIG. 2;

FIG. 5 is a schematic illustration showing the essential parts of a second embodiment of the hydraulic brake control circuit according to the present invention;

DESCRIPTION OF PREFERRED EMBODIMENTS

Figure 1:
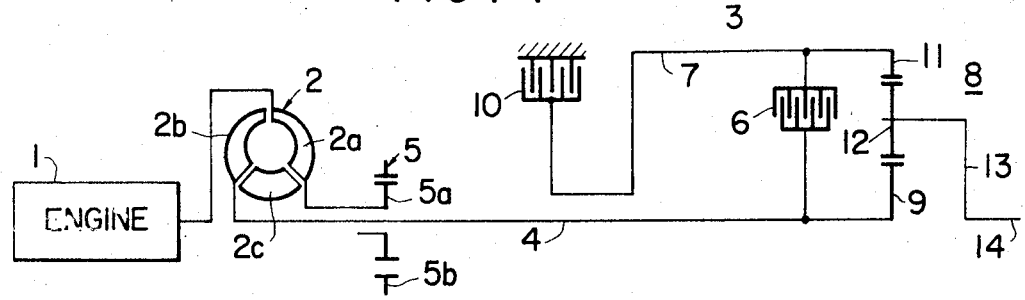
FIG. 1 is a schematic illustration showing an example of an automatic transmission for a vehicle with which the present invention is used.

Initially, FIG. 1 shows a two-forward-speed transmission in which the present invention is utilized. As illustrated, the output shaft of the engine 1 is connected to a pump impeller 2a of a torque coverter 2 which also consists of a turbine runner 2b and a stator 2c. The turbine runner 2b is connected to an input shaft 4 of a transmission 3 for transmitting engine rotation to the transmission. The pump impeller 2a of the torque converter 2 is connected to a drive gear 5a of an oil pump 5 consisting of the drive gear 5a and a driven gear 5b, for driving the oil pump 5 to produce an oil pressure to be described later.

In the transmission 3, the input shaft 4 is connected to a connecting line 7 through a first multiple disc clutch 6, and to a sun gear 9 of a planetary gear assembly 8. One end of the connecting line 7 is connected to a second multiple disc clutch or brake 10 secured to the case and the other end is connected to a ring gear 11 of the planetary gear assembly 8. The planetary gear assembly 8 includes a pinion 12 meshed between the sun gear 9 and the ring gear 11, the pinion 12 is also connected to the output shaft 14 through a carrier 13.

The transmission 3 operates as follows: when the second clutch 10 is released upon engagement of the first clutch 6 by the action of a hydraulic control assembly, to be described later, th sun gear 9, ring gear 11 and pinion 12 of the planetary gear assembly 8 are all rotated together to bring the output shaft 14 into a condition directly connected to the input shaft 4 so that both shafts rotate in the same manner. On the contrary, if the second clutch 10 is brought into an engaged position when the first clutch 6 is released, the ring gear 11 of the planetary gear assembly 8 is fixed so that the output shaft 14 is brought into a reduced condition relative to the input shaft 4 owing to the engaged relationship between the sun gear 9 and the pinion 12.

Figure 2:
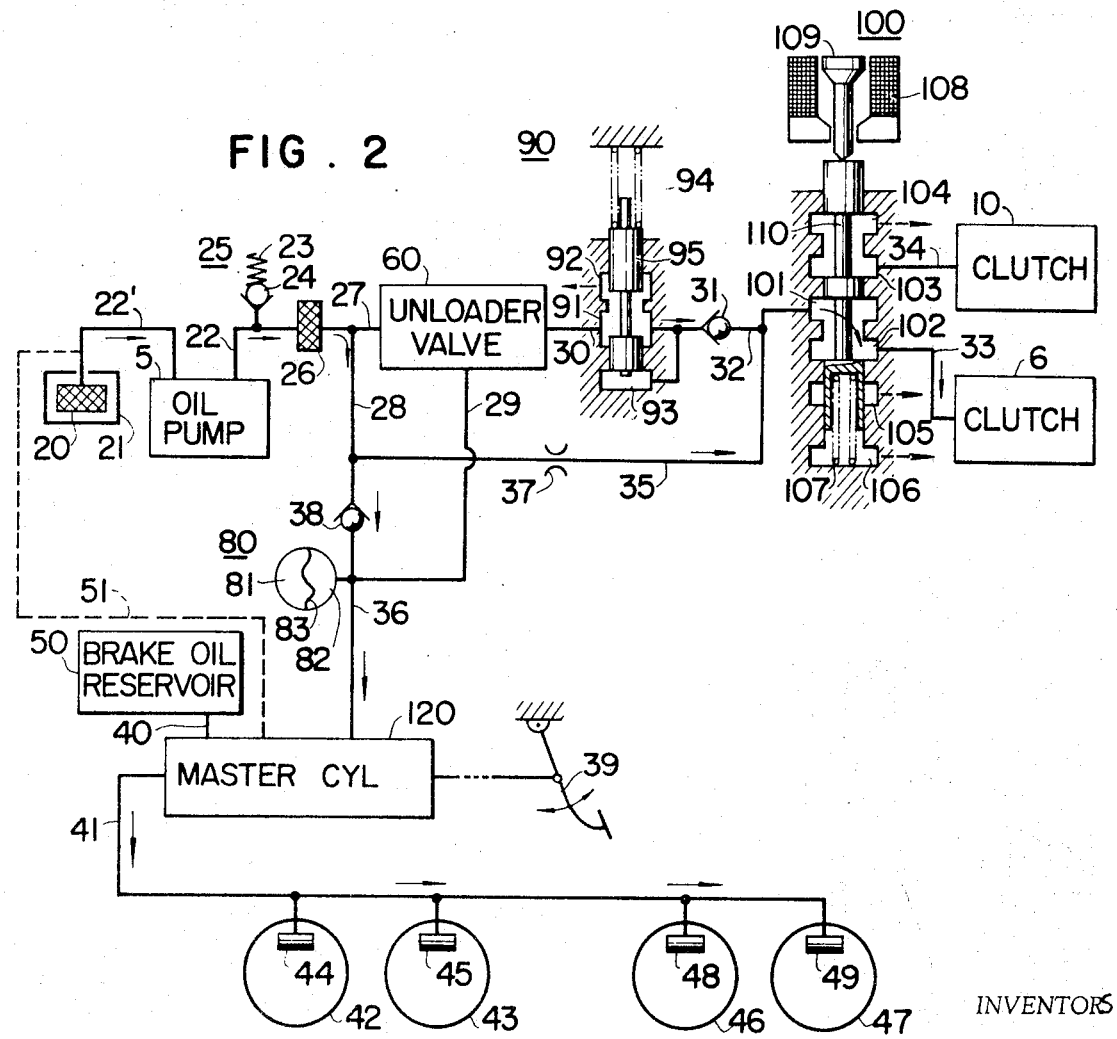

Now, the first embodiment of the hydraulic brake control circuit will be described with reference to FIGS. 2 and 4. First, the circuit arrangement of this embodiment is illustrated in FIG. 2 and includes a reservoir 21 containing a strainer 20 which is connected through an oil passage 22' to the intake side of an oil pump 5. An oil passage 22 is connected to the discharge side of the oil pump 5 and is provided with a safety valve 25 consisting of a spring 23 and a check ball 24. Further, a strainer 26 of finer mesh than the strainer 20 in the reservoir 21 is located in oil passage 22. An operative oil pressure is generated in this oil passage. The oil passage 22 is branched into oil passages 27 and 28, and the passage 27 is connected to an unloader or priority valve 60. On its discharge side, the unloader valve 60 is connected to an accumulator 80 through an oil passage 29 and is also connected to an oil pressure control valve 90 through an oil passage 30. Thus, oil pressure in the oil passage 27 is supplied either to the accumulator 80 or to the pressure control valve 90 depending on communication provided through the valve 60 with the oil passage 27. The accumulator 80 comprises two chambers 81, 82 separated by a diaphragm 83, the chamber 81 is filled with nitrogen gas, while chamber 82 stores or accumulates the pressurized hydraulic fluid. The volumes of the chambers 81 and 82 vary according to movement of the diaphragm for maintaining the oil pressure accumulated in the chamber 82 constant.

The pressure control valve 90 consists of an oil chamber 91 connected to the oil passage 30, a pressure-discharging oil chamber 92, an additional oil chamber 93 and an elongated valve body 95 extending through the oil chambers 91 and 92 into the oil chamber 93 and biased on one end by a spring 94. The valve body 95 is moved by oil pressure supplied from the oil passage 30 for controlling the operative oil pressure in the oil pressure control valve to a predetermined level.

The oil chamber 91 of the pressure control valve 90 is connected to a speed-change valve 100 through an oil passage 32 containing a check valve 31. The speed-change valve 100 consists of an oil chamber 101 connected to the oil passage 32, an oil chamber 102 connected to the first multiple disc clutch 6 through an oil passage 33, another oil chamber 103 connected to the second multiple disc clutch 10 through an oil passage 34, pressure-discharge oil chambers 104, 105, 106, and a valve body 110 biased through the valve from one end by a spring 107 and from the other end by a plunger 109 operated by a solenoid 108. The solenoid 108, when energized by electric current, causes the valve body 110 to move downwardly, bringing the oil chambers 101 and 103 into communication with each other for the passage of oil pressure to the clutch 10. At the same time, oil chambers 102 and 105 are placed in communication to allow the discharge of oil pressure from the clutch 6, thus obtaining a first speed in the transmission 3. When the solenoid 108 is de-energized by interrupting the electric current supply, the valve body 110 is biased upwardly, as shown, to direct oil pressure into the clutch 6 through communication between the oil chambers 101 and 102, and at the same time oil pressure in the clutch 10 is discharged through communication between the oil chambers 103 and 104, thus obtaining a reduced second speed in the transmission 3.

The other oil passage 28 branched off from the oil passage 22 is further divided into oil passages 35 and 36. One of the branched oil passages 35 contains an orifice 37 and is connected to the oil chamber 101 is the speed-change valve 100 for supplying oil pressure regardless of switching operation of the unloader valve 60. The other oil passage 36 includes a check valve 38 and is connected to a closed center type booster-attached master cylinder 120 through the chamber 82 in the accumulator 80. This closed center type booster-attached master cylinder 120 is connected to the brake pedal 39 in the driver's cab through a link mechanism, shown schematically. Further, the master cylinder is connected to a brake oil reservoir 50 through an oil passage 40, to the reservoir 21 through a pressure discharge oil passage 51, shown in dashed lines, and to the wheel cylinders 44, 45 of the front wheels 42, 43 and the wheel cylinders 48, 49 of the rear wheels 46, 47 through another oil passage 41. Thus, when the brake is applied, high oil pressure stored in the accumulator 80 acts, in response to depression of the brake pedal 39, to supply doubled braking oil pressure to the wheel cylinders 44, 45, 48, 49 from the brake oil reservoir 20.

The unloader valve assembly 60 is shown in FIG. 3 and includes an axially extending valve housing 61 forming oil chambers 62, 63 which are connected to the oil passages 27, 30, respectively, and an oil chamber 66 connected to the oil passage 29 through a ball seat 65 providing an oil hole 64. The housing 61 of the valve assembly 60 contains a slideably arranged valve body 69 consisting of a first land 67 located in the oil chamber 62 and a second land 68 situated in the oil chamber 63. The valve body 69 is provided with an axial projection 70 at one end and a valve seat 73 at the other end. The projection 70 contacts a ball 71 in the oil chamber 66, the ball 71 is arranged to open or close the hole 64 in the ball seat 65. The valve seat 73 has a hole 72, and a spring 75 is interposed between the valve seat 73 and a cover 74 extending transversely across one end of the valve housing 61.

The unloader valve 60, as described above, operates in the following manner. When the oil pressure stored in the accumulator 80 is lower than a certain prescribed level, the valve body 69 is biased downwardly by the spring 75, as shown, to block communication between the oil chambers 62 and 63. On the other hand, when the oil pressure in the accumulator 80 exceeds the prescribed level, the ball 71 and the valve 69 are lifted upwardly to establish communication between the oil chambers 62 and 63. The valve housing forms an oil passage 77 containing a blind plug 76 for preventing oil leakage to the outside. The oil passage 77 is connected to the oil chamber 63 for facilitating the sliding motion of the valve body. Similarly, an oil passage 72a having a blind plug 76a is also provided.

In FIG. 4 the arrangement of the closed center type booster-attached master cylinder 120 is illustrated and includes a cylinder casing 121 containing oil chambers 122 to 125 connected to the oil passages 36, 51, 40, 41, respectively. Further, the casing contains a slideably displaceable piston 131 and a spring 130 biasing a packing 128 against the one end of the piston. The cylinder casing 121 in combination with the end of the piston 131 forms an operative chamber 129 for generating braking oil pressure between the oil chambers 124 and 125. Further, annular chambers 126 and 127 are formed between the casing 121 and the recessed surface of the piston 131 and they communicate with the oil chambers 122 and 123, respectively.

The cylinder casing 121 is also provided at the opposite end of the piston with a holding or cover member 133 and a packing 132 for defining a servo chamber 134 between the holding member 133 and the piston 131. A thrust member 135 extends through the holding member 133 and is directly connected to the brake pedal 39. The piston 131 has an oil chamber 136 and a valve chamber 137 formed in the end adjacent the holding member 133. The oil chamber 136 communicates with the annular chambers 127 by means of an oil passage 138, and a hollow sleeve 139 is secured on the inner periphery of the valve chamber 137. The other annular chamber 126 communicates with the valve chamber 137 through an oil passage 140. Positioned within the sleeve 139 is a slideable valve stem 143 biased by a spring 144 and having a conical head 141 detachably secured to one end of the sleeve 139 and a horizontal oil passage 142 extending through the length of the stem 143. The thrust member 135 has a small-diameter portion 145 fitted into the valve chamber 137 of the piston 131, and at the end of the small-diameter portion 145, a conical valve seat 146 is formed which is detachably secured to the valve stem 143. The conical valve seat 146 communicates with the servo chamber 134 through an oil passage 147.

In the operation of the closed center type booster-attached master cylinder 120, described above, when the brake is released, the piston 131 and the thrust member 135 move as far as possible to the right, as shown in the FIG. 4, corresponding to the release or unloaded position of the brake pedal, and the valve stem 143 is separated from the conical valve seat 146 permitting oil pressure in the servo chamber 134 to pass through the pressure-discharge route of oil passage 147 — oil chamber 136 — valve chamber 137 — oil passage 138 — annular chamber 127 — oil chamber 123 to the reservoir 21, thereby discontinuing the braking operation. At the same time, the valve stem 143 is moved to the right as far as possible by the spring 144 and the end of the sleeve 139 comes into contact with the head 141 of the valve stem 143 to close the oil pressure supply route from the accumulator 80 — oil chamber 122— annular chamber 126 — oil passage 140.

When the brake pedal is pushed down to apply the brake force, the thrust member 135 is moved to the left and moves the conical valve seat 146 into contact with the valve stem 143, so that the servo chamber 134 is shut off from the above-mentioned pressure-discharge route to the reservoir 21 and, instead, is brought into communication with the valve chamber 137 through the oil passage 142 in the valve stem 143. Moreover, since the valve stem 143 is moved to the left against the force of the spring 144 with movement of the thrust member 135, the head 141 is separated from the end of the end of the sleeve 139 so that oil pressure supplied from the accumulator 80 is guided into the valve chamber 137 and then to the servo chamber 134 through the above supply route. The oil pressure supplied into the servo chamber 134 acts on the end face of the piston 131 causing the piston 131 to move to the left by an amount equal to the stroke of the thrust member 135, thereby doubling the braking oil pressure in the operative chamber 129. During this operation, the sleeve 139 is also moved along with the piston 131 and is kept in contact with the head 141 of the valve stem 143 to shut off the oil pressure supply route from the accumulator 80 to prevent further rise of the braking oil pressure. The conical valve seat 146 of the thrust member 135 maintains its contact with the valve stem 143.

If the brake pedal is pushed down further during this braking operation, the thrust member 135 is moved further to the left to let the head 141 separate from the end of the sleeve 139 so that oil pressure from the accumulator 80 is guided to the servo chamber to cause the corresponding movement of the piston 131 to produce doubled braking oil pressure within the operative chamber 129. Thus, according to the invention, when the brake is applied, the sleeve 139 and the valve stem 143 make separating and contacting movements corresponding to depressing of the brake pedal, for intermittently producing doubled braking oil pressures so that the braking action of the wheel cylinders 44, 45, 48, 49 against the front wheels 42, 43 and rear wheels 46, 47 is effected simultaneously. While, when the braking force is released, the thrust member 135 is returned to its rightward position with release of the brake pedal and also the piston 131 is forced to return to its righward position by the spring 130 for effecting the separation of the conical valve seat 146 from the valve stem 143, and restoring the original nonbraked condition.

Following the above described structural description of the hydraulic brake control circuit according to the first embodiment of the present invention, its operational aspect will now be discussed. When the oil pressure stored in the accumulator 80 is below a certain prescribed level, the unloader valve 60 shuts off the oil passages 27 and 30 so that working oil pressure for speed-change control is supplied directly to the speed-change valve 100 through the oil passage 35 while being throttled by the orifice 37, and at the time oil pressure is directed through the oil passage 36 to and stored in the accumulator 80. On the other hand, if the oil pressure in the accumulator 80 is above the prescribed level, the unloader valve 60 is positioned to provide communication between the oil passages 27 and 30 so that the working oil pressure, while being adjusted by the pressure control valve 90, is supplied to the speed-change valve 100 through the oil passage 32 as well as through the oil passage 35. In this case, the check valve 38 located in the oil passage 36 does not allow the escape of high oil pressure stored in the accumulator 80. The high oil pressure in the accumulator 80 is supplied to the closed center type booster-attached master cylinder 120 when the brake is applied, and multiplied braking oil pressure is produced corresponding to the extent to which the brake pedal is depressed, and this braking oil pressure is supplied simultaneously to the wheel cylinders 44, 45, 48 and 49 to arrest motion of the front and rear wheels 42, 43 and 48, 49 with equal braking force. As mentioned above, according to the hydraulic brake control circuit of the first embodiment of the present invention, oil pressure supplied by the oil pump 5 can be used not only for normal speed-change control but also for producing multiplied braking force when the brake is applied. Further, this device, as used as a braking force multiplying means, produces many benefits in the structural and operational aspects.

In FIG. 5 the second embodiment of the hydraulic brake control circuit is shown and the hydraulic control circuit, the brake system and the speed-change effecting means are hydraulically connected to the oil pump 5 substantially in the same manner as in the first embodiment described above. The oil passage 35 for constantly supplying oil pressure in the hydraulic control circuit is branched off from the oil passage 28 for guiding oil pressure to the braking circuit, and a priority valve is positioned in the line of the oil passage 35. The brake priority valve 150 has a slideable valve body 152 biased at one end by a spring 151 and provided with an oil chamber 153 at the other end, connected to the oil passages 28 and 36. Further, the valve 150 forms an oil chamber 154 connected to the oil passage 35. In operation, when the oil pressure rises above a certain prescribed level, the valve body 152 is forced against the biasing action of the spring 151 and brings the oil chambers 153 and 154 into communication for allowing passage of oil pressure from the oil passage 28 to the hydraulic braking circuit through the oil passage 35. On the other hand, when oil pressure drops below the prescribed level, communication between the oil chambers 153 and 154 is blocked by the valve body 152 cutting off the supply of oil pressure to the hydraulic braking circuit through the oil passage 35 and preventing any drop of oil pressure in the braking circuit.

Thus, the braking system according to the second embodiment of this invention is arranged to supply oil pressure above a certain level to the braking circuit side to give priority to the braking operation, so that should the rotational frequency of the engine and the pump capacity be lowered or should the oil pressure discharged from the pump be reduced owing to some problem or other, the second embodiment prevents any large reduction in the braking performance and ensures the safety of the vehicle.

Figure 6:
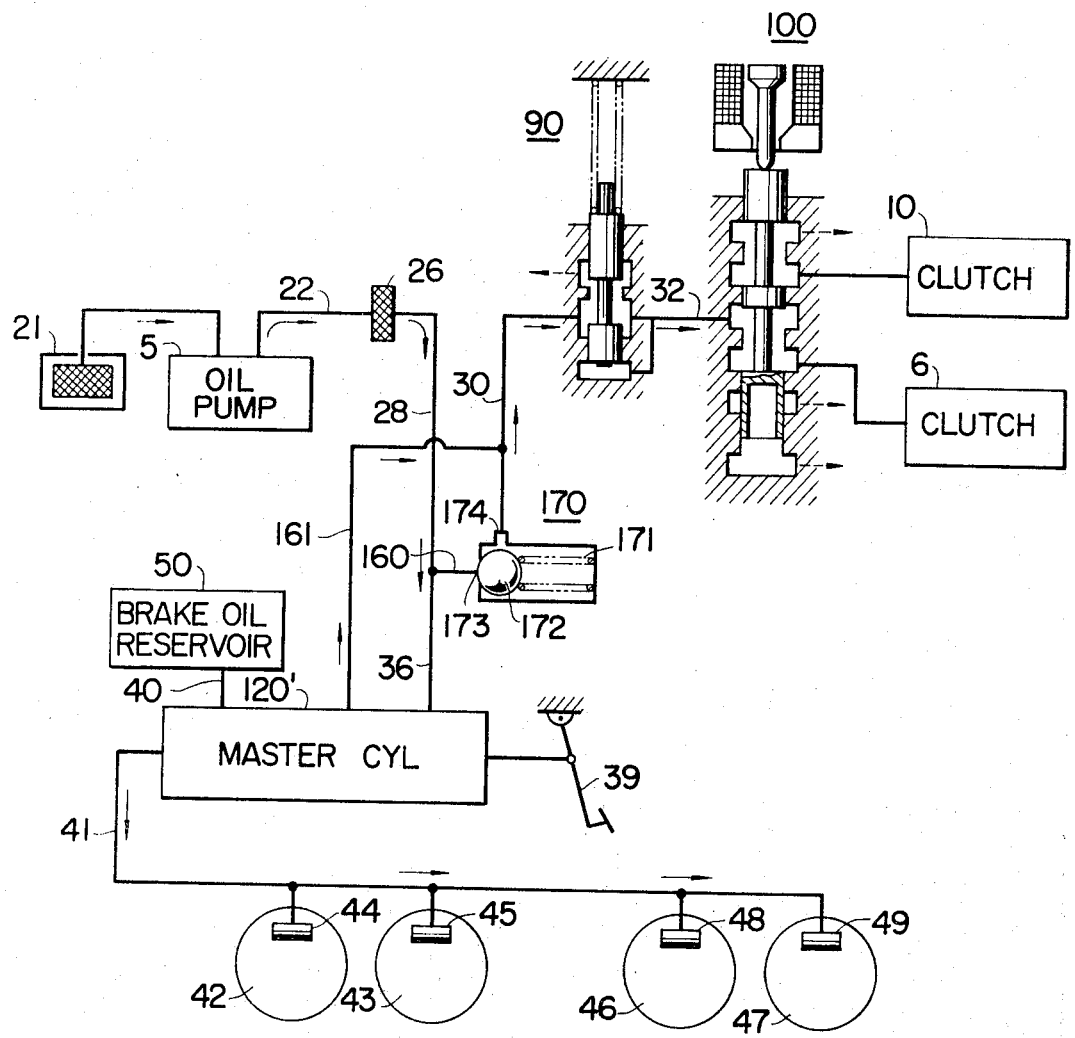
FIG. 6 shows a third embodiment of the hydraulic brake control circuit according to the present invention.
Figure 7:
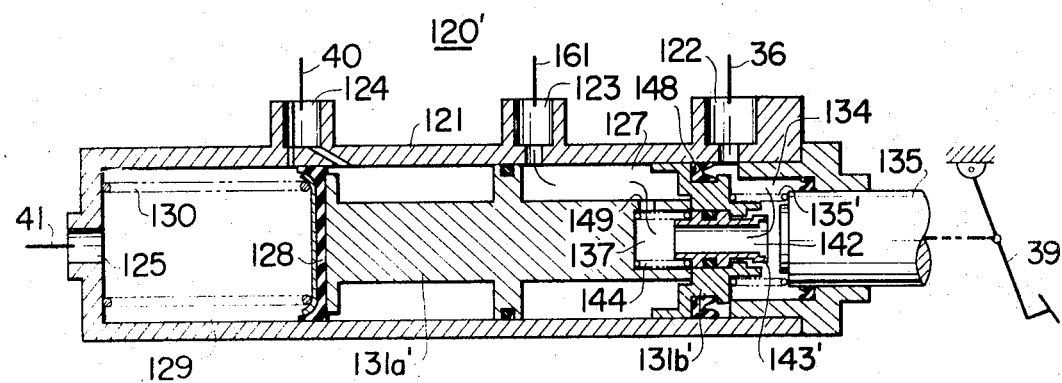
FIG. 7 shows, in section, an open center type booster-attached master cylinder shown in FIG. 6.

In FIGS. 6 and 7 the third embodiment of the hydraulic brake control circuit is illustrated, with the system outlined in FIG. 6. As in the preceding description, the oil passage 28 is connected to the oil passage 22 which contains the oil pump 5 and the strainer 26 and leads directly to the braking circuit side and is branched into oil passages 36 and 160. The oil passage 160 is connected through a relief valve 170 to the oil passage 30 leading to the pressure control valve 90 which has the same arrangement as in the preceding embodiments. The pressure control valve 90 is connected through the oil passage 32 to the speed-change valve 100 of the hydraulic control circuit, which is also the same as described above. The relief valve 170 has a valve body 172 biased by a spring 171 and also contains an oil chamber 173 connected to the oil passage 160 and an oil chamber 174 connected to the oil passage 30. In the operation of the relief valve 170, when the circuit oil pressure is increased during the booster operation (which is described later) at the time of application of the brake, the valve body 172 is forced to move against the action of the spring 171 and establishes communication between the oil chambers 173 and 174 for limiting the maximum oil pressure.

The oil passage 36 is connected to an open center type booster-attached master cylinder 120'. This open center type booster-attached master cylinder 120' is connected to the brake pedal 39 in the driver's cab. Additionally, it is also connected to the brake oil reservoir 50 through the oil passage 40, and also to the wheel cylinders 44, 45, 48, 49 of the wheels 42, 43, 46, 47 through the oil passage 41, and to the oil passage 30 of the hydraulic control circuit through an oil pressure supply passage 161, for supplying oil pressure to the hydraulic control circuit to achieve speed change and to provide a doubled braking force when the brake is applied.

In FIG. 7 the open center type booster-attached master cylinder 120' is shown and includes the cylinder casing 121 which has oil chambers 122 – 125 connected to the oil passages 36, 161, 40 and 41, respectively. Within the casing a slideably fitted first piston 131a' is positioned along with a packing 128 which is pressed against the end of the piston by a spring 130. The piston 131a' produces braking oil pressure in an operative chamber 129 which extends between the oil chambers 124 and 125. A valve chamber 137 within the piston 131a' is in continuous communication through an orifice 149 and an annular chamber 127 communicated with the oil chamber 123. At the opposite end of the casing from oil chamber 125 the thrust member 135 extends into the casing 121 and a seal is provided by the packing 132. The thrust member is connected to the brake pedal 39. Attached to the first piston 131a' is a second hollow piston 131b' which is provided with a packing 148 and is slideably fitted in the cylinder casing 121 for defining with the piston 131a' the annular chamber 127. The second piston 131b' is connected to the thrust member 135 through a spring 135' and is arranged to maintain the oil chamber 122 in constant communication with a servo chamber 134 having a throttling action. A spring 144 is disposed in the valve chamber 137 and has fitted in its inside a valve stem 143' forming an oil passage 142.

In operation, when the brake is not applied, the thrust member 135 and the first and second pistons 131a' and 131b' stay as far to the right as possible, as seen in FIG. 7, to keep the servo chamber 134 in a non-throttled or full-open condition. Accordingly, an oil pressure difference is produced between the servo chamber 134 and the oil passage 142, causing oil pressure from the oil passage 36 to pass immediately into the oil passage 161 through the servo chamber 134, oil passage 142, valve chamber 137, orifice 149 and annular chamber 127.

When the brake pedal 39 is depressed for applying the braking action, the thrust member 135 is moved to the left approaching the valve stem 143' so as to throttle the servo chamber 134. This results in producing an oil pressure difference between the servo chamber 134 and the oil passage 142 corresponding to the flow rate therethrough and the area of the opening, and this oil pressure difference causes the second piston 131b' and the first piston 131a' to move to the left to produce a doubled braking oil pressure in the operative chamber 129. During this operation, the valve stem 143' also moves with the movement of the second piston 131b' to extend the space between the valve stem and the thrust member 135, so that the braking oil pressure does not increase but remains at a level corresponding to the stroke of the thrust member 135.

A description of the general operation of the hydraulic brake control circuit according to the third embodiment of the present invention now follows. The discharged oil pressure from the oil pump 5 is always supplied to the pressure control valve 90, the speed-change valve 100 and one of the multiple disc clutches 6 or 10 through the center open type booster-attached master cylinder 120' and oil passages 161 and 30 to perform the speed-changing function. As a result, when the brake pedal 39 is pushed down to apply the brake, the booster-attached master cylinder 120' is operated by the oil pressure difference produced by the throttling action to produce doubled braking oil pressures in the wheel cylinders 44, 45, 48 and 49 of the wheels 42, 43, 46, and 47, respectively. In this case, although the booster-attached master cylinder 120' performs the throttling action to vary the flow rate of oil passing therethrough, it continues to supply operative oil pressure to the hydraulic control circuit to allow continued speed-changing performance. If this throttling action is excessively high, the relief valve 170 operates to guide a portion of oil pressure to the hydraulic control circuit through the oil passage 160. As described above, the hydraulic brake control circuit according to the third embodiment of the present invention, though different in arrangement from the first embodiment, can achieve the same effect and bring about many benefits structurally and operatively when used as a braking force doubling means.

Figure 8:
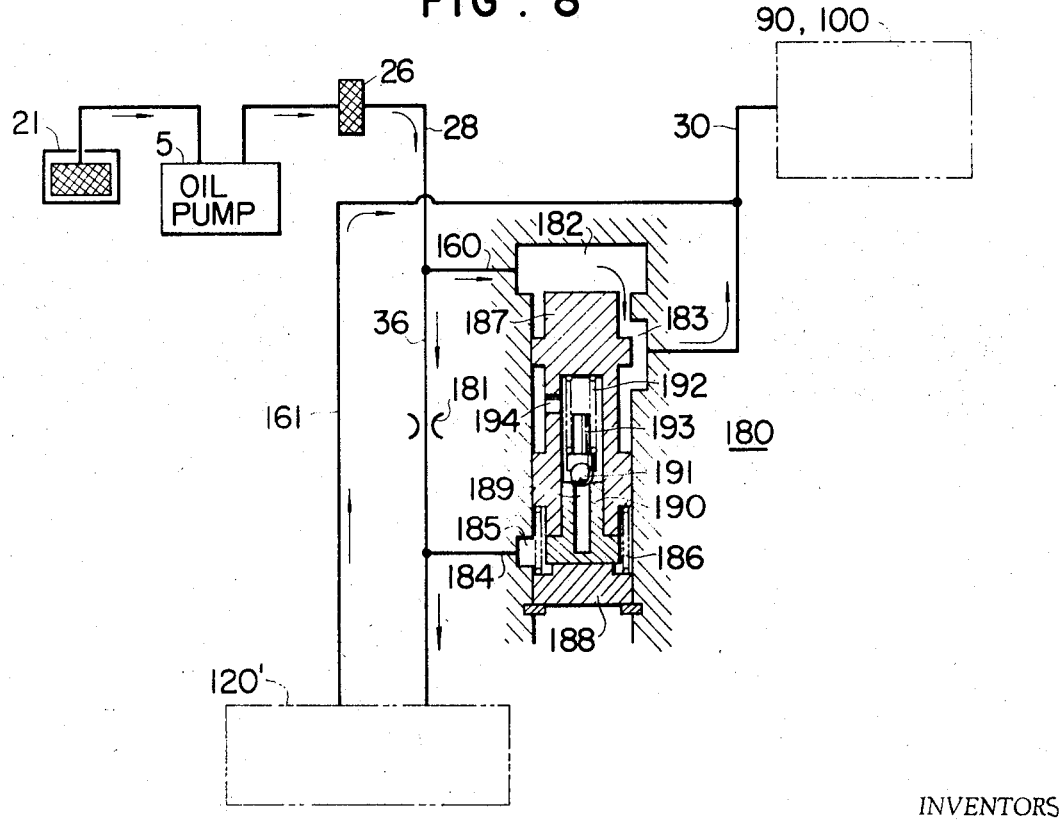
FIG. 8 shows another embodiment of the hydraulic brake control circuit according to the present invention.

The hydraulic brake control circuit according to the fourth embodiment of the present invention is shown in FIG. 8. The hydraulic connection between the oil pump 5 and the hydraulic control circuit and braking circuit is made substantially in the same manner as in the third embodiment. A relief-attached flow control valve assembly 180 having a throttle section 181 is positioned in an oil passage 160 branched off from the oil passage 28 which is connected to the oil pump 5 and leads to the hydraulic control circuit. Another oil passage 36 branches off from the oil passage 28 and leads to the braking circuit. The throttle section 181 is located in oil passage 36. The relief-attached control valve assembly 180 includes an oil chamber 182 connected to the oil passage 160, an oil chamber 183 connected to the oil passage 30, an oil chamber 185 connected to the oil passage 36 on the discharge side of the throttle section 181 through an oil passage 184, and a valve body 187 biased by a spring 186. The valve body 187 is moved downwardly in dependance on the oil pressure difference in the throttle section 181 to direct oil pressure in the oil passage 28 to the oil passage 30 for keeping the flow rate in the oil passage 36 constant.

In the valve body 187 of the relief-attached flow control valve assembly 180, there are provided the following: a first ball seat 190 arranged to receive the oil pressure of the oil passage 36 in the oil chamber 185, an oil passage 189 opened and closed relative to the valve seat 188, a ball 191 arranged to open and close the oil passage 189, and a second ball seat 193 biased by a spring 192 into contact with the ball 191. An orifice 194 is also formed in the valve body 187, thus constituting a relief valve. According to this arrangement, should oil pressure in the oil passage 36 be raised abnormally high, a portion of such oil pressure is conveyed to the oil passage 30 through the oil passage 189 and orifice 194, thereby limiting the maximum oil pressure in the oil passage 36.

Thus, according to the hydraulic brake control circuit of the fourth embodiment of the present invention, oil pressure discharged from the oil pump 5 and supplied directly to the open center type booster-attached master cylinder 120' is always kept constant, so that the circuit loss is reduced as compared with the third embodiment and it is also possible to prevent change of the working performance of the brake resulting from variation of discharged oil pressure from the oil pump 5 in accordance with variation of the rotational frequency of the engine.

As appreciated from the foregoing discussion, the hydrualic brake control circuit according to any embodiment of the present invention has the splendid advantage that the oil pump, which is normally used for operation of the transmission, can also be utilized for doubling the braking force.

While specific embodiments of the invention have been shown and described in detail to illustrate the application of the inventive pinciples, it will be understood that the invention may be embodied otherwise without departing from such principles.

What is claimed is:

1. A hydraulic brake control circuit connected to a transmission and to a brake system in a vehicle, comprises means for doubling the braking force in said brake system, means for effecting a speed change in said transmission, an oil pressure source, an oil pump connected to said oil pressure source, connecting means extending between said oil pump and both of said means for effecting a speed-change and said means for doubling a braking force for supplying pressurized oil from said oil pump to each of said means, said connecting means comprising a first passage containing a orifice for conveying pressurized oil from said pump to said speed-change means, a second passage extending in parallel with said first passage for conveying pressurized oil to said speed-change means from said pump, and unloader valve located in said second passage, a third passage extending between said oil pump and said means for doubling the braking force, an accumulator located in said third passage and in communication with said unloader for operating said unloader valve, a check valve positioned said third passage, and said means for doubling the braking force includes a master cylinder connected to said third passage downstream from said check valve and said accumulator.

* * * * *